United States Patent [19]

Viale

[11] Patent Number: 5,098,042

[45] Date of Patent: Mar. 24, 1992

[54] SYSTEM FOR MAINTAINING A SET OF DEPLOYABLE ELEMENTS IN A FOLDED POSITION ON A SPACECRAFT

[75] Inventor: Daniel Viale, Fayence, France

[73] Assignee: Societe Anonyme dite: Aerospatiale Societe Nationale Industrielle, Parris, France

[21] Appl. No.: 647,516

[22] Filed: Jan. 25, 1991

[30] Foreign Application Priority Data

Feb. 6, 1990 [FR] France .................. 90 01352

[51] Int. Cl.$^5$ .................. E04H 12/18; E05D 15/26
[52] U.S. Cl. .................. 244/173; 52/110; 52/645; 160/213
[58] Field of Search .............. 244/158 R, 173; 52/108, 52/109, 110, 111, 127.11, 645, 646; 70/386; 292/252; 343/915, DIG. 2; 74/89; 160/213

[56] References Cited

U.S. PATENT DOCUMENTS

| | | | |
|---|---|---|---|
| 3,267,625 | 8/1966 | Holzschuh et al. | 52/111 |
| 3,291,423 | 12/1966 | Britton, Jr. | 244/149 |
| 3,553,984 | 1/1971 | Grumbach | 70/99 |
| 4,151,872 | 5/1979 | Slysh et al. | 244/173 |
| 4,290,168 | 9/1981 | Binge | 244/173 |

FOREIGN PATENT DOCUMENTS 2443383  7/1980  France .

Primary Examiner—Joseph F. Peters, Jr.
Assistant Examiner—Virna Liss Mojica
Attorney, Agent, or Firm—Marshall, O'Toole, Gerstein, Murray & Bicknell

[57] ABSTRACT

A system for maintaining in a folded position a set of elements that are hinged to one another and to a structure (e.g. solar panels on a spacecraft), which elements are capable of occupying either said folded position in which said elements form a stack, or else a deployed position in which said elements are in end-to-end alignment, said system comprising:

a retaining member passing through said elements in the folded positive and connected by a first one of its ends to said structure and bearing via a second one of its ends against the outermost element of said set;

locking means for locking said retaining member in the folded position of said elements; and control means for unlocking said locking means and releasing said retaining member, thereby enabling said set of elements to pass from the folded position to the deployed position.

15 Claims, 4 Drawing Sheets

SYSTEM FOR MAINTAINING A SET OF DEPLOYABLE ELEMENTS IN A FOLDED POSITION ON A SPACECRAFT

FOLDED POSITION ON A SPACECRAFT

The present invention relates to a system for maintaining a set of deployable elements in a folded position, the elements being hinged to one another and to a structure.

BACKGROUND OF THE INVENTION

More particularly, but not exclusively, the system of the invention is intended for maintaining a set of solar panels in a folded position, the solar panels being fitted to spacecraft, such as artificial satellites, in particular. Thus, when in the folded position, the elements constitute a zig-zag stack, whereas when in the deployed position, after the retaining system has been withdrawn, the said elements are in end-to-end alignment with one another and the element closest to the structure is hinged thereto.

While a spacecraft is being launched by rocket or by space shuttle, these elements (which may be constituted by several square meters of solar panels) must be folded close together and pressed against the structure of said spacecraft and they must be maintained in that position throughout the launch phase and while being put into orbit.

Suitable systems are used to keep the elements in the folded position and to allow the elements to be deployed by remote control from Earth.

In general, such maintaining systems comprise:

a retaining member passing perpendicularly through said elements in the folded position, with a first end of the retaining member being connected to the structure of the spacecraft while its other end bears against the outermost element of said set;

means for locking the retaining member in the folded position of said elements; and control means for unlocking said locking means and releasing said retaining member, thereby enabling said set of elements to pass from the folded position to the deployed position under the action, for example, of springs incorporated in the hinges.

In the embodiment taught by patent Document FR-A-2 443 383, the locking means of the maintaining system comprise, in particular, a locking pin disposed perpendicularly to the retaining member and having one of its ends which is provided with a sloping surface engaging in a lateral notch formed near the first end of the retaining member, which notch is provided with a complementary sloping surface. The retaining member and the locking pin are received in respective bores formed in a housing which is fixed to the structure of the spacecraft. In addition, releasable locking elements are associated with the locking pin to prevent it being withdrawn. When these locking elements are actuated, the locking pin responds to the action of a spring and disengages from the retaining member, thereby releasing it and thus allowing the solar panels to pass to their deployed position.

However, this technical solution is not very satisfactory mechanically and may fail to release the retaining member appropriately. The first end of the retaining member is maintained by the locking means in an asymmetrical manner and this may lead to the retaining member becoming mis-aligned on being released. In addition, contact both between the sloping surfaces of the locking pin and of the retaining member, and between the retaining member and the corresponding bore means that friction is high and runs the risk of preventing the retaining member being released.

An object of the present invention is to remedy these drawbacks and to provide a system for maintaining a set of elements in a folded position, which system includes locking means of a design that guarantees the retaining member is properly released when the locking means are actuated.

SUMMARY OF THE INVENTION

To this end, the present invention provides a system for maintaining in a folded position a set of elements that are hinged to one another and to a structure (such as solar panels on a spacecraft), which elements are capable of occupying either said folded position in which said elements form a stack, or else a deployed position in which said elements are in end-to-end alignment, said system comprising:

a retaining member passing through said elements in the folded position and connected by a first one of its ends to said structure and bearing via a second one of its ends against the outermost element of said set;

locking means for locking said retaining member in the folded position of said elements; and control means for unlocking said locking means and releasing said retaining member, thereby enabling said set of elements to pass from the folded position to the deployed position;

wherein said locking means comprise a plurality of balls regularly distributed around the first end of said retaining member and engaging in respective spherical depressions formed around said first end; and wherein said control means comprise a cam-forming piece coaxial with said retaining member and capable of occupying a first position in which said balls are urged with point contact by the cam-forming piece into the spherical depressions of said retaining member, thereby locking it, and a second position in which the balls are moved away from the spherical depressions of said retaining member, thereby releasing it.

Thus, since the retaining member is maintained by a plurality of balls regularly distributed around its first end, it is released without hindrance when said balls are retracted simultaneously. In addition, the use of balls limits friction considerably since only point contacts are involved.

In a preferred embodiment, two identical sets of n balls mounted in series are disposed diametrically opposite each other about said retaining member with each set of balls cooperating, in the first position of the cam-forming piece, with a respective one of opposite spherical depressions formed around said first end of the retaining member.

Advantageously, said locking balls are housed in passages formed through a body which is fixed to said structure and in which the cam-forming piece and the first end of the retaining member are disposed, each of the passages opening out firstly facing said cam-forming piece and secondly facing the corresponding spherical depression.

In this embodiment, the two sets of balls are received in two respective angled passages that are symmetrical to each other about the retaining member, such that, when the cam-forming piece is in its first position, the first ball of each set being in point contact with the cam-forming piece in a direction parallel to the retaining member, while the last ball in each set is pressed against the corresponding spherical depression in a direction radial to the retaining member.

Preferably, said cam-forming piece is cylindrical in shape with one of its transverse faces orthogonal to the retaining member being provided with regularly spaced-apart notches, said locking balls being pressed against said transverse face when the cam-forming piece is in its first position, and when said cam-forming piece is controlled to rotate to pass from its first position to its second position, said balls withdraw simultaneously to be received in said notches, thereby releasing said retaining member. The arc length of each notch should then corresponds to not less than the sum of the diameters of each set of balls.

In addition, said control means may further include a torsion spring connected to said cam-forming piece and to said structure, and a pin fixed radially to said cam-forming piece and connected to the structure via controllable rupture means. Thus, when the rupture means, e.g. of the explosive type, are actuated, the initially prestressed torsion spring expands and causes the cam-forming piece to rotate so that it moves from its first position to its second position, thereby simultaneously moving the balls away from said spherical depressions and causing them to be received in the notches of the cam, thus releasing the retaining member which is itself urged outwards by driving resilient means. As a result, the solar panels in turn pass from their folded position to their deployed position, e.g. under the action of springs incorporated in their hinges.

Advantageously, in order to facilitate rotation of the cam-forming piece and to reduce the force required for unlocking, the cam-forming piece is itself mounted to rotate on a ball abutment, in which case said ball abutment co-operates with the other transverse face of said cam-forming piece opposite to its face having said notches. In addition, said spherical depressions are provided on an endpiece applied to the first end of said retaining member.

The means for adjusting the position of the balls in the passages may be provided on said body. Advantageously, said adjustment means are constituted by a plurality of screws engaging the body and intended to bear on the balls, two of said screws disposed orthogonally to each other acting respectively in a radial direction and in an axial direction relative to the retaining member on that one of the balls in each set of balls which is situated at the angle in the corresponding angled passage, in such a manner as to ensure that the balls in each set of balls make point contacts with one another.

Further, since the dimensions of the solar panels may be large, it may be necessary to provide a plurality of systems for maintaining said panels in the folded position.

To this end, the present invention also provides a set of systems of the type defined above distributed over said structure to maintain said elements (such as solar panels on a spacecraft), wherein the control means for controlling the locking means of said systems are associated with one another by at least one cable connected to the structure and including rupture means.

Advantageously, said cable is connected to each of the pins of said systems in such a manner that when said cable is ruptured under the action of the rupture means, the torsion springs of said systems rotate the cam-forming pieces simultaneously, causing the balls to move away from the spherical depressions formed in said retaining members.

It may be observed that by using a cable to actuate the set of systems, a single explosive device suffices as rupture means.

Preferably, two groups of systems are provided on said structure for maintaining said elements in position, each group being controlled by a respective cable, one end of each of said cables being connected to a common cable on which said rupture means are disposed, while the other ends of said cables are connected to said structure via respective traction springs.

Thus, when said common cable is ruptured, the traction springs participate in rotating the cam-forming pieces and provide redundancy with the torsion springs.

BRIEF DESCRIPTION OF THE DRAWINGS

An embodiment of the invention is described by way of example with reference to the accompanying drawings, in which.

In the above figures, similar items are designated by identical references.

MORE DETAILED DESCRIPTION

Figure 1:
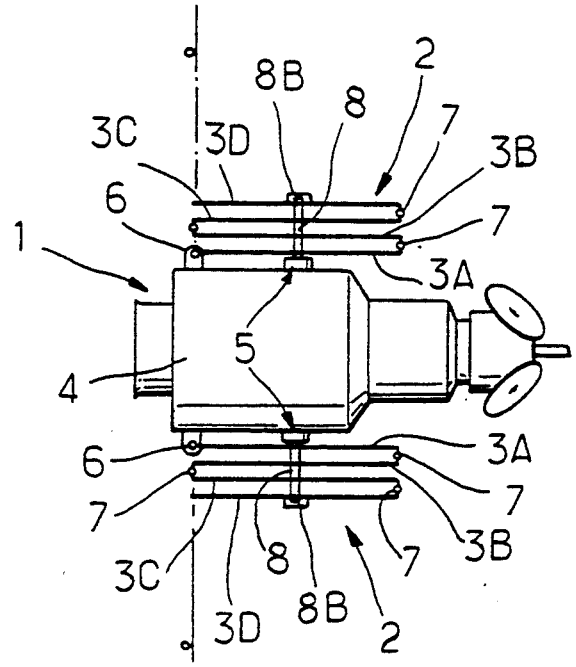
FIG. 1 is a diagram of an artificial satellite fitted with two sets of solar panels held in the folded position by maintaining systems of the invention.

The artificial satellite 1 shown in FIG. 1 is fitted, for example, with two identical sets 2 of solar panels 3A, 3B, 3C, and 3D, each set 2 of panels occupying a zig-zag folded position relative to the structure 4 of the satellite and being locked in this position by at least one maintaining system 5 of the invention.

The innermost panel 3A of each set 2 is rotatably connected to the structure 4 of the satellite 1 by a hinge 6, and the panels 3A, 3B, 3C, and 3D are themselves connected to one another by hinges 7. The solar panels are provided on one of their faces with solar cells (not shown) such that when the panels of said sets are in the deployed position in end-to-end alignment after the maintaining systems 5 have been unlocked (as shown in dot-dashed lines in FIG. 1), the solar cells face towards the sun.

Figure 2:
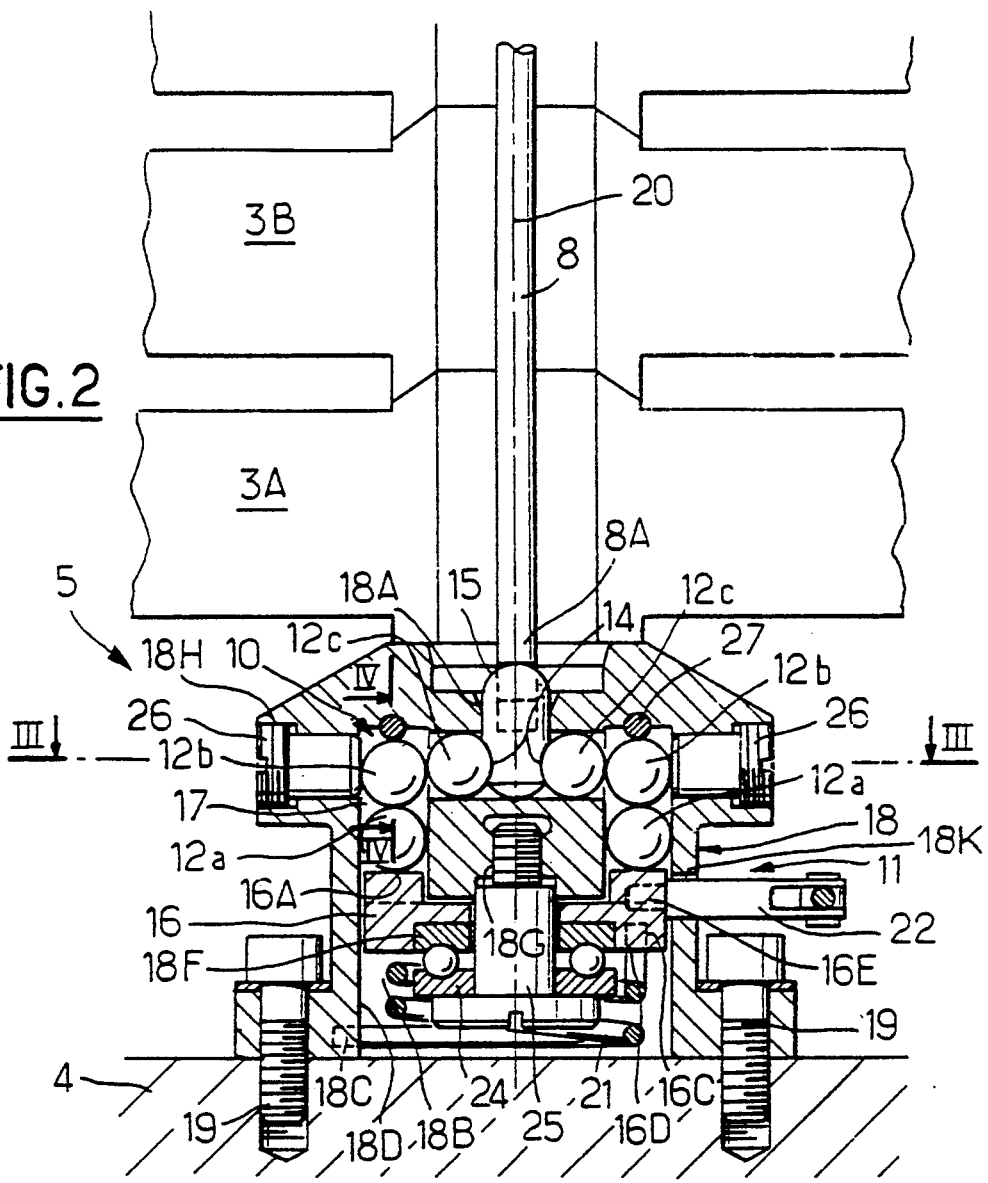
FIG. 2 is a longitudinal section through a preferred embodiment of the system of the invention shown in a first position in which the retaining member of said system is locked and holds said solar panels in the folded position.

As shown in FIG. 2, each maintaining system 5 comprises:

a retaining member 8 passing perpendicularly through the panels 3A, 3B, 3C, and 3D in the folded position and connected at a first one of its ends 8A to the structure 4 of the satellite 1 while its second end 8B (FIG. 1) bears against the outermost solar panel 3D of the corresponding set 2, thus maintaining the panels pressed against one another;

locking means 10 for locking the member 8 so that it retains said panels in the folded position; and control means 11 for unlocking the locking means 10 and thus releasing the retaining member 8, thereby enabling each set of solar panels to pass from the folded position to the deployed position, e.g. under the action of springs incorporated in the hinges 7 and not shown specifically.

Figure 7:
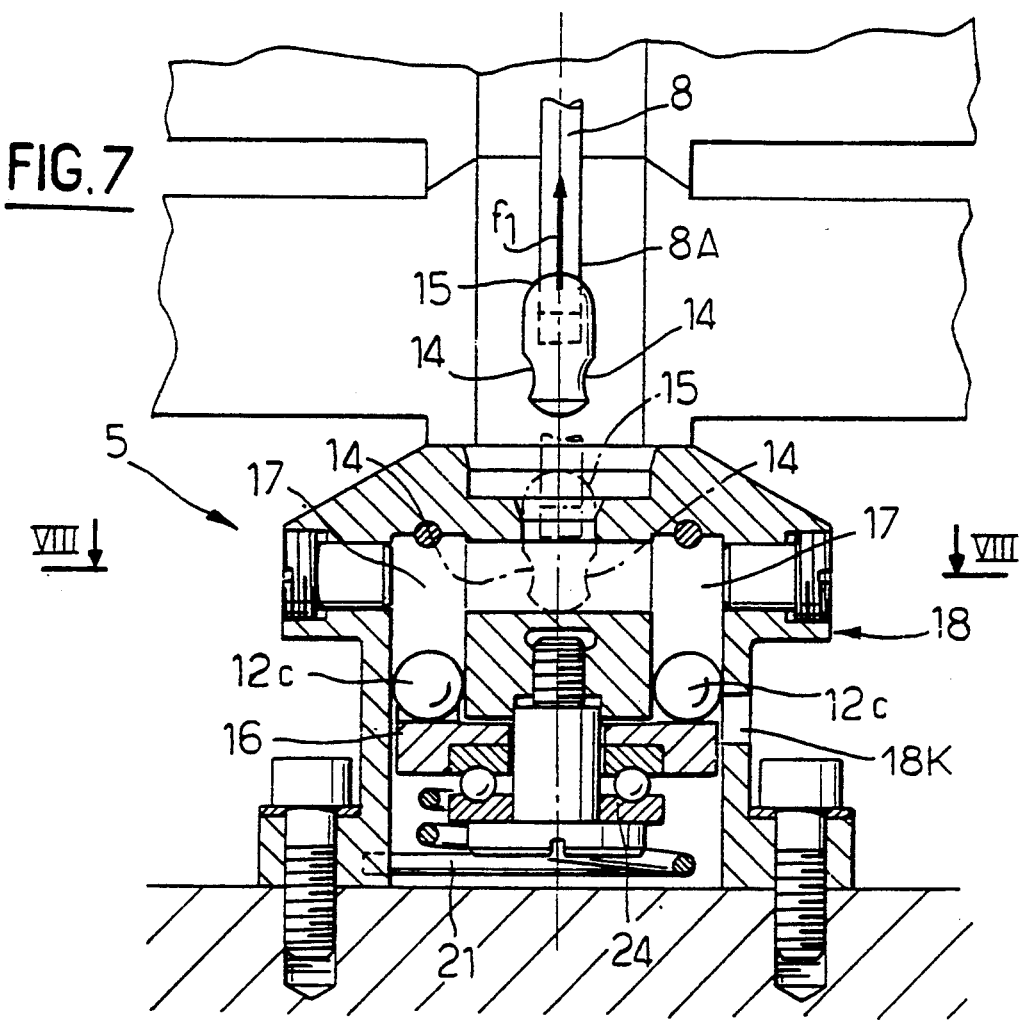
FIG. 7 is a section similar to FIG. 2 and corresponding to one of the systems of FIG. 6, shown in a second position where the retaining member has been released, thereby allowing the solar panels to pass from the folded position to the deployed position.
Figure 8:
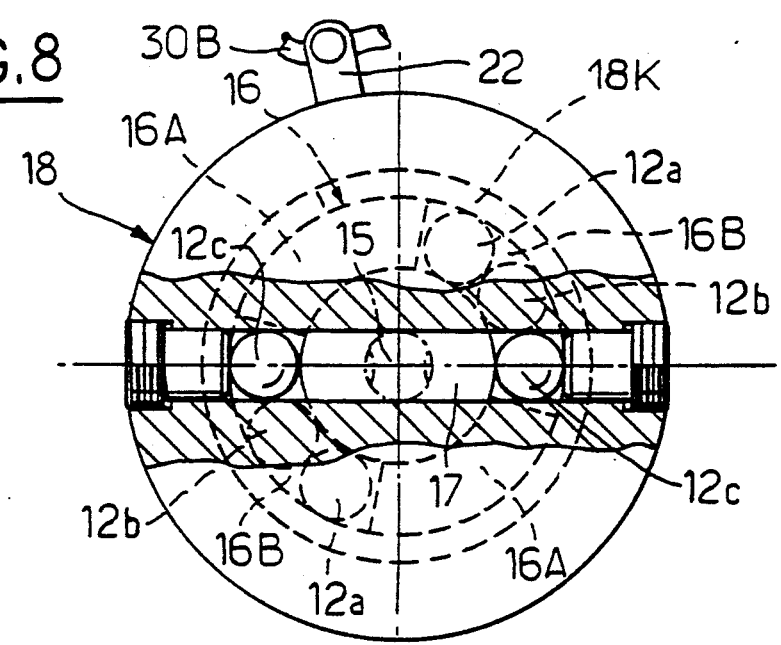
FIG. 8 is a section through said system on line VIII—VIII of FIG. 7.

In accordance with the invention, the locking means 10 comprise balls 12 regularly distributed around the retaining member 8 and engaging in respective spherical depressions 14 formed, in this embodiment, in an endpiece 15 which extends the first end 8A of the retaining member 8 by being screwed thereon. The control means 11 then include, in particular, a cam-forming piece 16 disposed coaxially with said retaining member and suitable for occupying either a first position as shown in FIG. 2 in which the balls 12 are urged by the piece 16 into the spherical depressions 14 via point contacts, thereby locking the retaining member, or else a second position in which the balls 12 are at a distance from the spherical depressions 14, thereby releasing the retaining member 8 (as shown in FIGS. 7 and 8).

Figure 3:
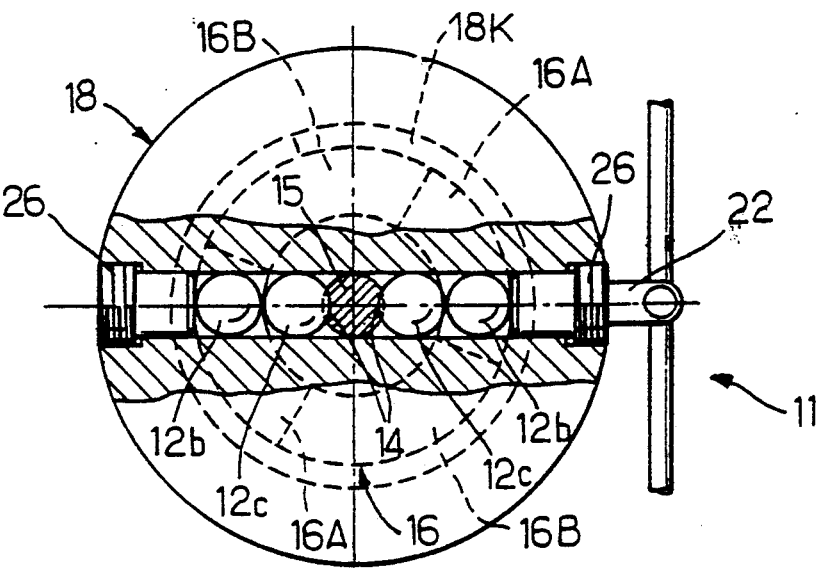
FIGS. 3 and 4 are sections through said system on lines III—III and IV—IV respectively of FIG. 2.

In the embodiment shown in FIGS. 2 and 3, two identical sets of three balls each 12a, 12b, and 12c are disposed diametrically opposite each other about the retaining member 8. It can thus be seen in these figures that the balls 12c cooperate with two spherical depressions 14 formed on opposite sides of the endpiece 15 which is screwed to the first end of the member 8. These balls 12c are urged by point contacts into the depressions by the intermediate balls 12b which are in turn urged by point contacts by the balls 12a which are themselves in contact with the cam-forming piece 16.

The sets of balls are received in respective passages 17 formed in a body 18 which is generally circularly symmetrical and which is fixed to the structure 4 of the satellite by screws 19. The endpiece 15 extending the retaining member 8 is inserted into a bore 18A lying on the axis 20 of the body 18, while the cam-forming piece 16 which is generally annular in shape is rotatably received in a cylindrical cavity 18B provided about the axis 20 in the body 18. In the embodiment shown in FIG. 2, both passages 17 are angled, being disposed symmetrically about the axis 20 of the body 18 on which the retaining member 8 lies when in this position. The two angled passages 17 open out firstly looking at the spherical depressions 14 provided in the endpiece 15, and secondly looking at one (16A) of the transverse faces of the piece 16. In FIG. 2, it can thus be seen that the first ball each set makes point contact with the transverse face 16A of the piece 16 in a direction parallel to the retaining member, i.e. corresponding to the axis 20, whereas the third ball 12c of each set bears against the corresponding spherical depression 14 in a radial direction relative to the retaining member, i.e. perpendicularly to the axis 20. The second ball 12b or intermediate ball in each set disposed at the angle in the angled passage makes contact with the first and third balls 12a and 12c under the control of adjustment means which are described below.

Figure 5:
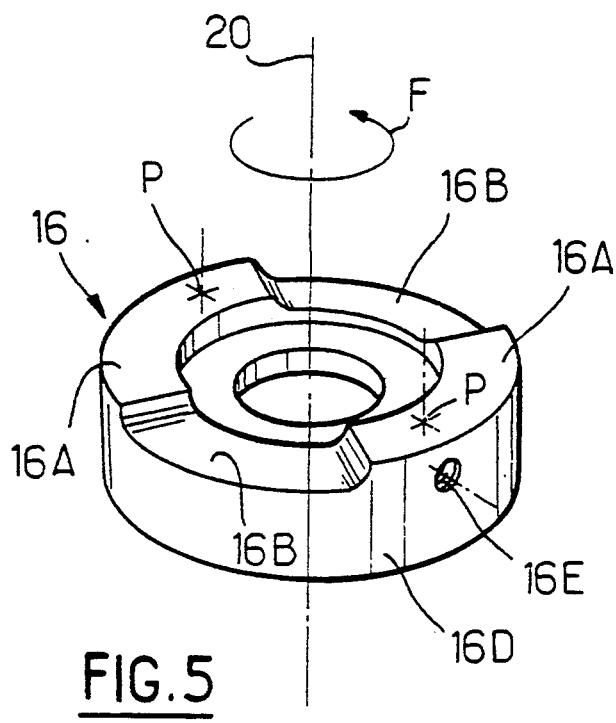
FIG. 5 is a perspective view of the cam-forming piece of said system.

The cam-forming piece 16 shown more particularly in FIG. 5 is provided with two notches 16B formed in its transverse face. The notches 16B are arcuate in shape and are disposed symmetrically to each other about the axis of the circularly symmetrical cam-forming piece 16. Their points of contact with the first balls 12a when the piece 16 is in its first position are referenced P.

It will thus be understood that by rotating the piece 16 in the direction of arrow F, thus moving it from its first position towards its second position, said balls may be received simultaneously in the notches 16B, thereby releasing the retaining member 8. The arc length of each notch corresponds to not less than the sum of the diameters of each set of balls.

In order to rotate the piece 16 and move it from its first position to its second position, the control means 11 include, in addition to the piece 16, a prestressed torsion spring 21 having one of its ends connected to the body 18 and its other end connected to the piece 16, and a pin 22 fixed to the piece 16 and projecting radially from the body 18 and connected to the structure 4 via remotely controllable rupture means 23 which are described below.

More particularly, FIG. 2 shows a blind hole 18C formed radially in the side wall 18D delimiting the cylindrical cavity 18B of the body 18, with the blind hole receiving one of the ends of the torsion spring 21 whose other end is engaged in a blind hole 16C formed in the transverse face 16D of the piece 16 opposite to its transverse face receiving the balls 12. The pin 22 is screwed into a tapped hole 16E extending radially from the periphery of the cam-forming annular piece 16 and passes radially through a slot 18K provided through the body 18.

In addition, in order to facilitate rotation of the cam-forming piece 16, it is rotatably mounted on a ball abutment 24 which is disposed in a recess 18F formed in the transverse face 16D of the piece 16 and which is maintained therein by a screw 25 engaging in a tapped hole 18G of the body 18.

Figure 4:
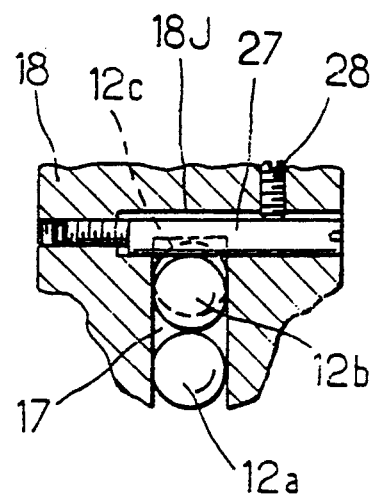

Means are provided for adjusting the positions of the balls in their respective passages 17. Thus, FIG. 2 shows two screws 26 received in opposite radial tapped holes 18H in the body 18 and serving to act radially relative to the retaining member on respective ones of the balls 12b located at the angles in the respective passages, thereby ensuring point contact between the balls 12b and 12c in each set and adjusting the engagement of the balls 12c in the depressions. In addition, FIGS. 2 and 4 show two excentric screws 27 extending transversely in respective orifices 18J in the body and also acting on the intermediate balls 12b, this time in a direction parallel to the retaining member for the purpose of ensuring point contact between the balls 12b and 12a in each set. Lock screws 28 hold the excentric screws 27 in the desired positions. The screw 25 holding the abutment 24 against the piece 16 also positions said piece axially, thereby positioning the balls in the passages.

Thus, by means of these various adjustment screws, the balls in each set are maintained in point contact with one another and with the corresponding depression 14 and with the transverse face 16A of the piece 16, while also ensuring certain and reliable evacuation of the sets of balls into the respective notches when the cam-forming piece passes from its first position to its second position.

In addition, when a satellite is fitted with solar panels of large dimensions, it is necessary to provide a set of systems for maintaining the panels in the folded position.

Figure 6:
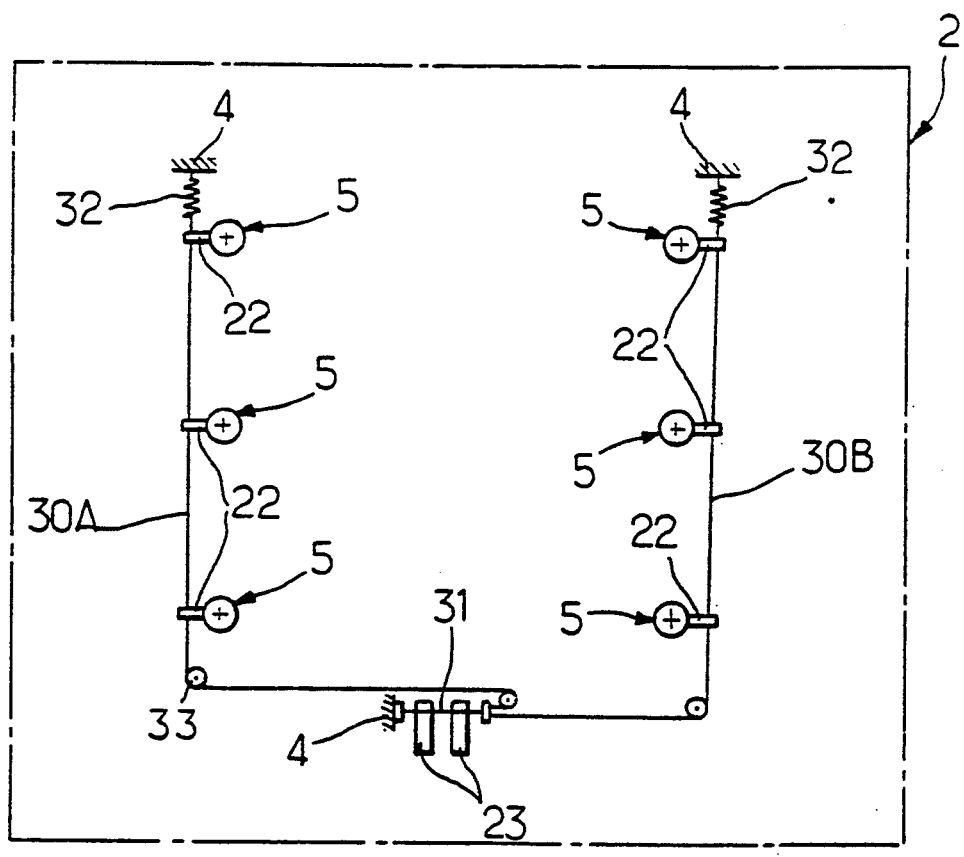
FIG. 6 is a diagrammatic plan view of a set of maintaining systems for holding solar panels in the folded position.

Thus, as shown diagrammatically in FIG. 6, six systems of the invention may advantageously be mounted on the structure 4 of the satellite to lock each set of panels.

In this embodiment, the six systems are distributed in two groups of three.

Three systems 5 have their pins 22 interconnected by a cable 30A. Similarly, three systems 5 have their pins 22 interconnected by means of a cable 30B. One end of each of the cables 30A and 30B is connected to one end of a common cable 31 whose other end is fixed to the structure 4. The common cable has the rupture means 23 fitted thereto, which rupture means may be constituted in this case by two conventional explosive devices. The other two ends of the cables 30A and 30B are connected to the structure 4 of the satellite by means of respective traction springs 32. The cables 30A and 30B are guided around pulleys 33, as is the cable 31, thereby maintaining them under tension.

In this application, the set of systems 5 of the invention operates as follows. Once the satellite 1 has been put into orbit, the explosive devices 23 are actuated, thereby rupturing the common cable 31 and consequently releasing the cables 30A and 30B which are connected to the cable 31. At this moment, in each group of systems 5, the initially prestressed torsion springs 21 connected to the cam-forming pieces 16 fixed to the pins 21 relax spontaneously, thereby simultaneously pivoting the rotary pieces 16 and the pins 22 in their respective slots. As a result, the balls 12a, 12b, and 12c in each set move out from the angled passages 17 and are received in the notches 16B under drive from the retaining members 8 which are urged outwardly by conventional driving resilient means (not shown).

Simultaneously, the sets of solar panels deploy spontaneously under the action of the springs incorporated in their hinges.

FIGS. 7 and 8 show the second position of the cam-forming piece in one of the maintaining systems after the explosive devices have been actuated. The initial position of the retaining member 8 is shown in dot-dashed lines and solid lines show a position that it occupies fleetingly in direction F1 under drive from the driving resilient means and after the balls 12 received in the notches 16B of the piece 16 have moved away.

It may also be observed that the traction springs 32 participate with the torsion springs 21 in pivoting the cam-forming pieces since they pull on the pins via the cables 30A and 30B.

I claim:

1. A system for maintaining in a folded position a set of elements that are hinged to one another and to a structure (such as solar panels on a spacecraft), which elements are capable of occupying either said folded position in which said elements form a stack, or else a deployed position in which said elements are in end-to-end alignment, said system comprising:

a retaining member passing through said elements in the folded position and connected by a first one of its ends to said structure and bearing via a second one of its ends against the outermost element of said set;

locking means for locking said retaining member in the folded position of said element; and control means for unlocking said locking means and releasing said retaining member, thereby enabling said set of elements to pass from the folded position to the deployed position;

wherein said locking means comprise a plurality of balls regularly distributed around the first end of said retaining member and engaging in respective spherical depressions formed around said first end; and wherein said control means comprise a cam-forming piece coaxial with said retaining member and capable of occupying a first position in which said balls are urged with point contact by the cam-forming piece into the spherical depressions of said retaining member, thereby locking it, and a second position in which the balls are moved away from the spherical depressions of said retaining member, thereby releasing it.

2. A system according to claim 1, in which two identical sets of n balls mounted in series are disposed diametrically opposite each other about said retaining member with each set of balls co-operating, in the first position of the cam-forming piece, with a respective one of opposite spherical depressions formed around said first end of the retaining member.

3. A system according to claim 1, wherein said locking balls are housed in passages formed through a body which is fixed to said structure and in which the cam-forming piece and the first end of the retaining member are disposed, each of the passages opening out firstly facing said cam-forming piece and secondly facing the corresponding spherical depression.

4. A system according to claim 2, wherein the two sets of balls are received in two respective angled passages that are symmetrical to each other about the retaining member, such that, when the cam-forming piece is in its first position, the first ball of each set being in point contact with the cam-forming piece in a direction parallel to the retaining member, while the last ball in each set is pressed against the corresponding spherical depression in a direction radial to the retaining member.

5. A system according to claim 1, wherein said cam-forming piece is cylindrical in shape with one of its transverse faces orthogonal to the retaining member being provided with regularly spaced-apart notches, said locking balls being pressed against said transverse face when the cam-forming piece is in its first position, and when said cam-forming piece is controlled to rotate to pass from its first position to its second position, said balls withdraw simultaneously to be received in said notches, thereby releasing said retaining member.

6. A system according to claim 5, wherein the arc length of each notch corresponds to not less than the sum of the diameters of each set of balls.

7. A system according to claim 1, wherein said control means further include a torsion spring connected to said cam-forming piece and to said structure, and a pin fixed radially to said cam-forming piece and connected to the structure via controllable rupture means.

8. A system according to claim 1, wherein said cam-forming piece is mounted to rotate on a ball abutment.

9. A system according to claim 8, wherein said ball abutment co-operates with the other transverse face of said cam-forming piece opposite to its face having said notches.

10. A system according to claim 1, wherein said spherical depressions are provided on an endpiece applied to the first end of said retaining member.

11. A system according to claim 3, wherein adjustment means are provided on said body for adjusting the positions of the balls in the passages.

12. A system according to claim 11, wherein said adjustment means are constituted by a plurality of screws engaging the body and intended to bear on the balls, two of said screws disposed orthogonally to each other acting respectively in a radial direction and in an axial direction relative to the retaining member on that one of the balls in each set of balls which is situated at the angle in the corresponding angled passage, in such a manner as to ensure that the balls in each set of balls make point contacts with one another.

13. A set of systems as defined in claim 1, distributed over said structure to maintain said elements (such as solar panels on a spacecraft), wherein the control means for controlling the locking means of said systems are associated with one another by at least one cable connected to the structure and including rupture means.

14. A set according to claim 13, wherein said cable is connected to each of the pins of said systems in such a manner that when said cable is ruptured under the action of the rupture means, the torsion springs of said systems rotate the cam-forming pieces simultaneously, causing the balls to move away from the spherical depressions formed in said retaining members.

15. A set according to claim 13, wherein two groups of systems are provided on said structure for maintaining said elements in position, each group being controlled by a respective cable, one end of each of said cables being connected to a common cable on which said rupture means are disposed, while the other ends of said cables are connected to said structure via respective traction springs.

* * * * *